G. W. DONNING.
ENGINE.
APPLICATION FILED JUNE 18, 1909.
1,170,966.
Patented Feb. 8, 1916.
6 SHEETS—SHEET 1.
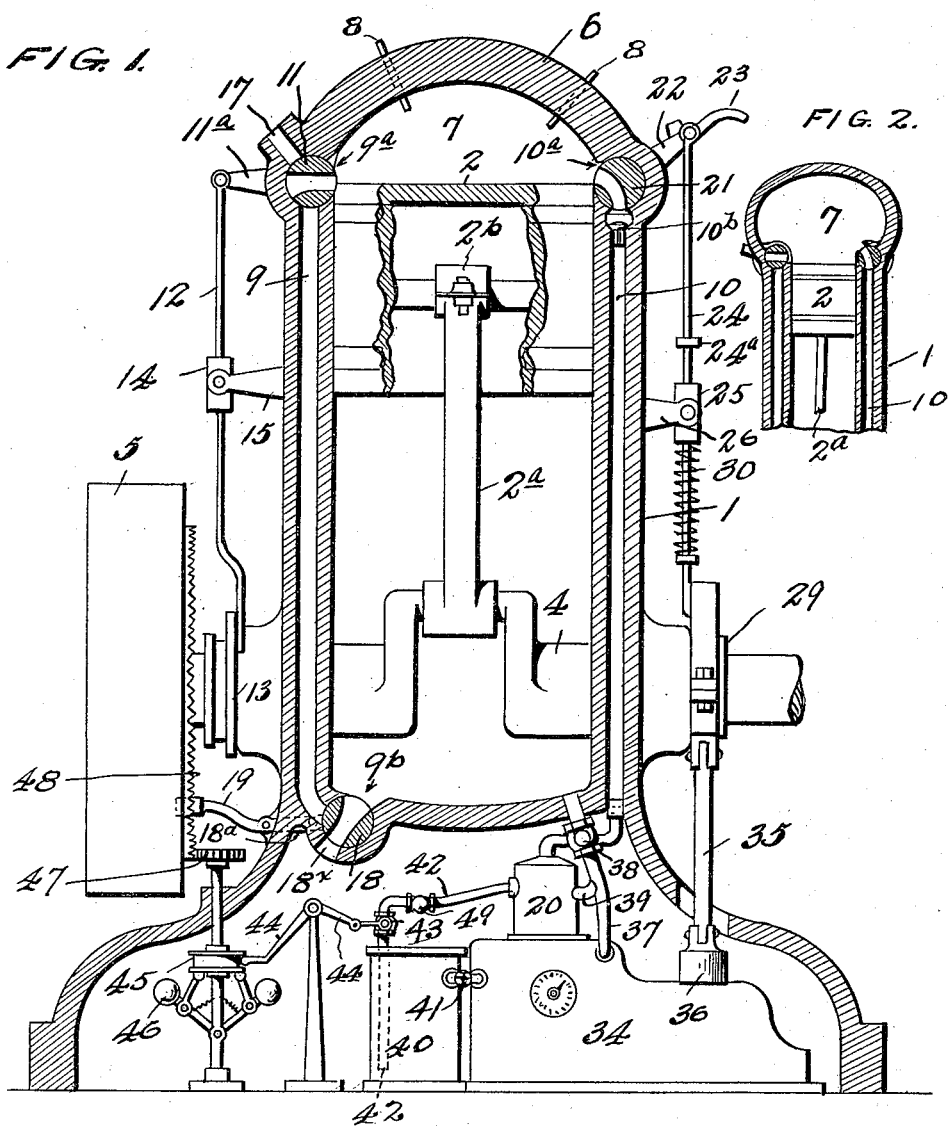

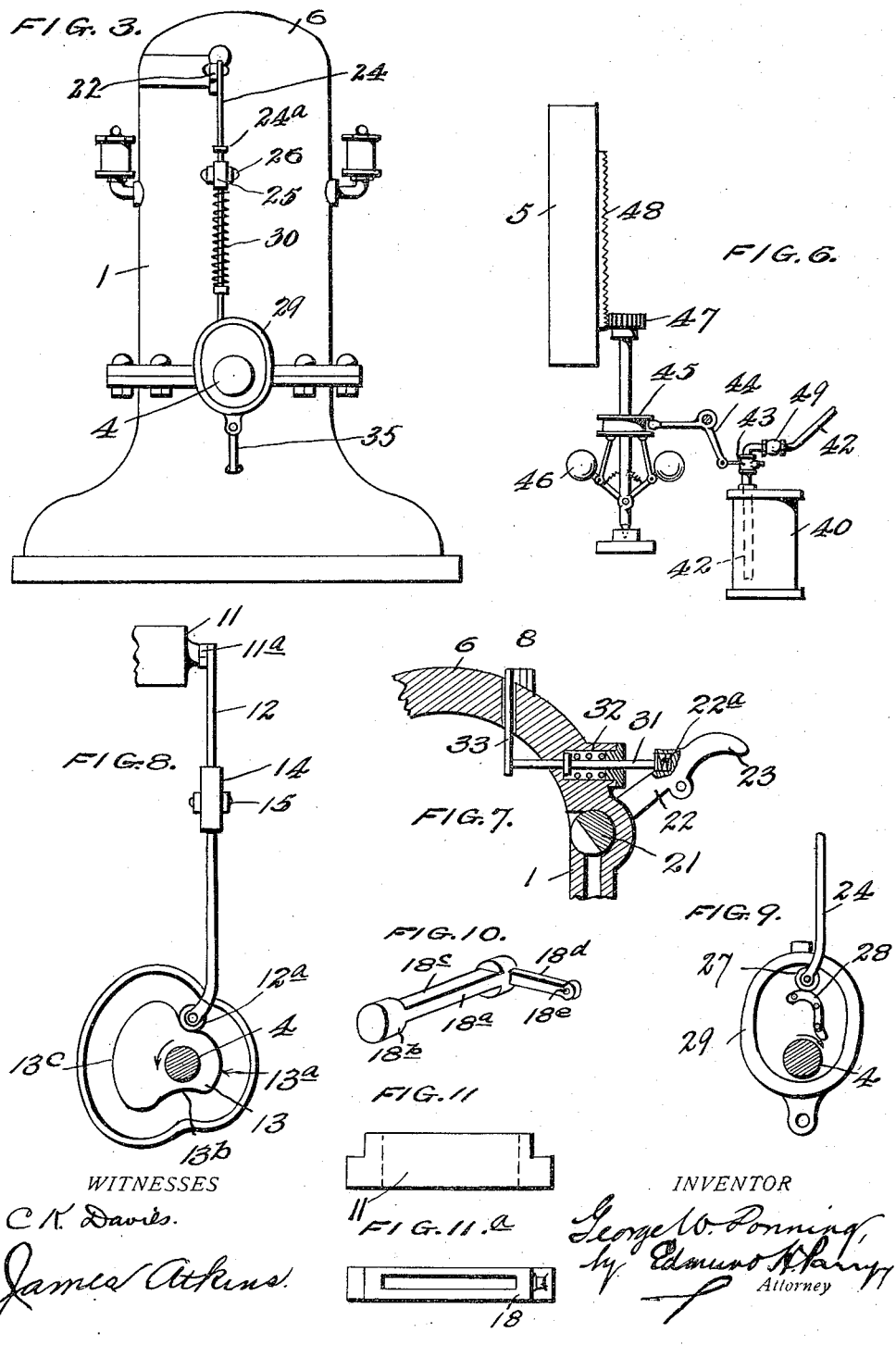

G. W. DONNING.
ENGINE.
APPLICATION FILED JUNE 18, 1909.
1,170,966.
Patented Feb. 8, 1916.
6 SHEETS—SHEET 3.
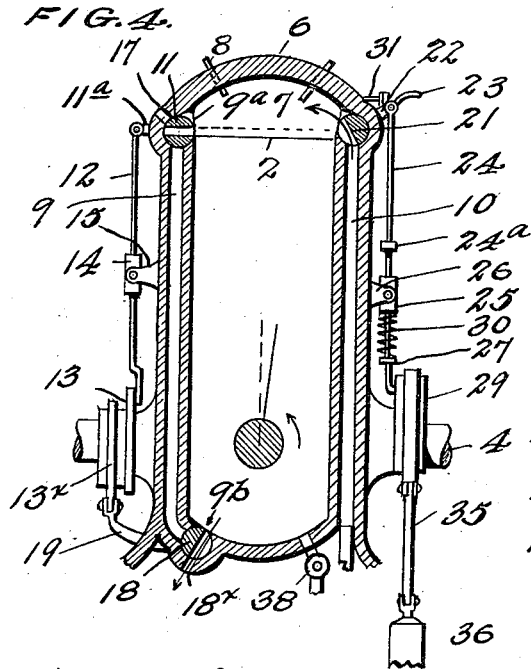
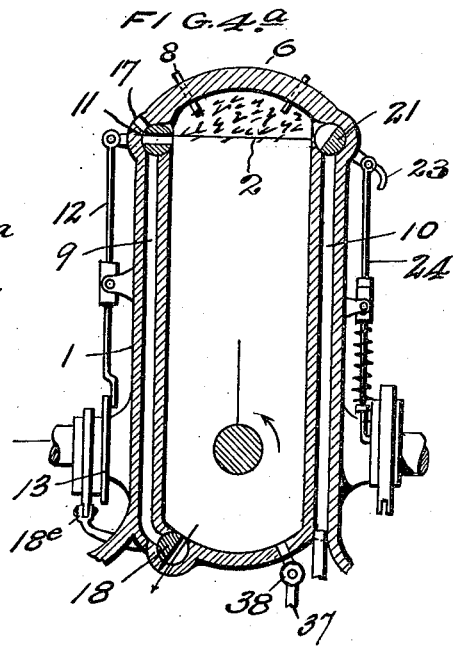
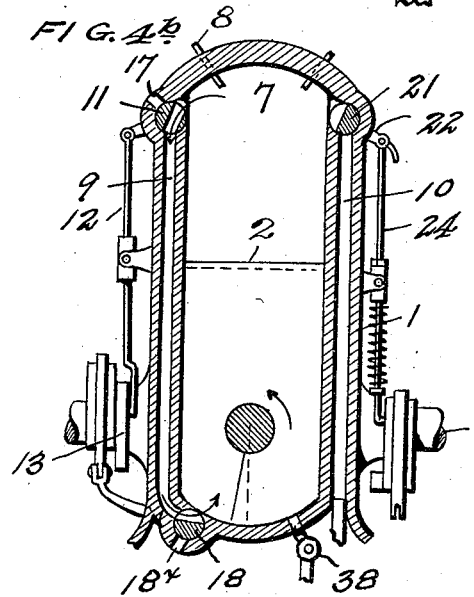
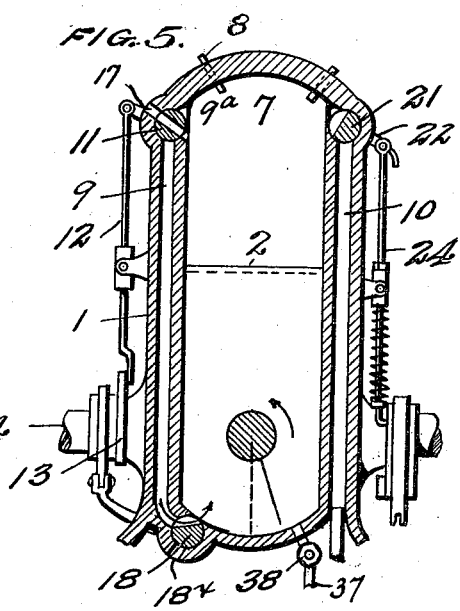
WITNESSES
INVENTOR

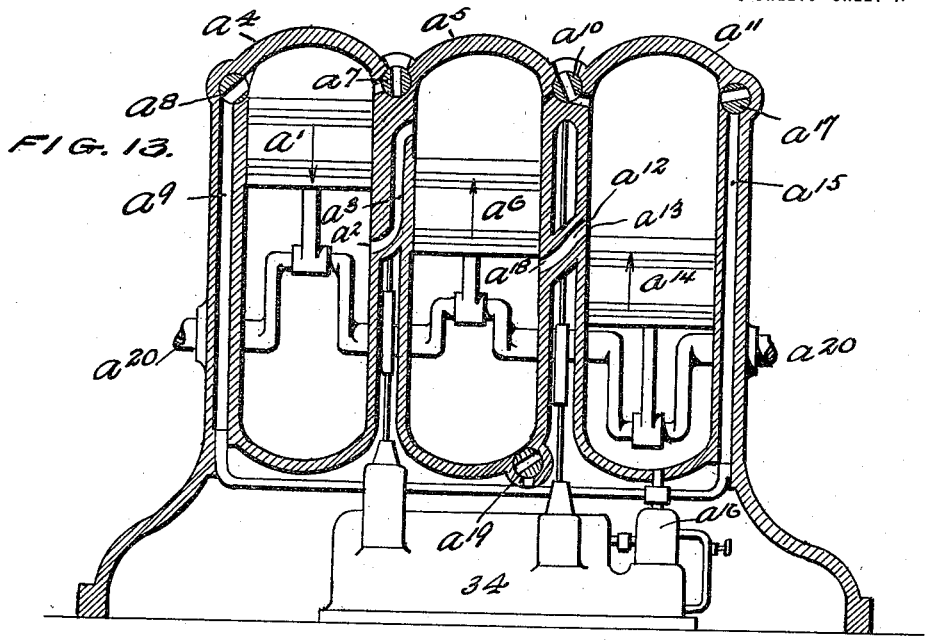
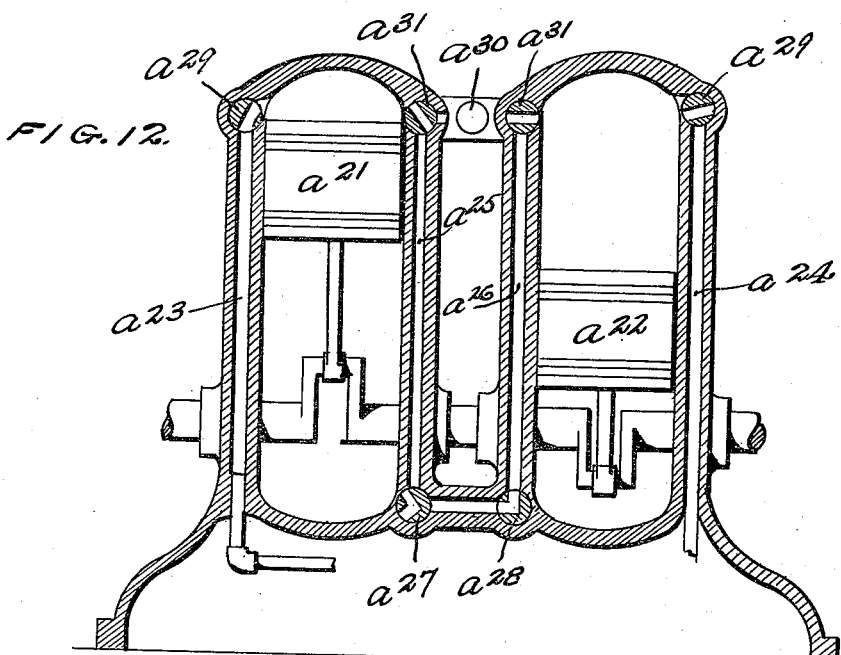

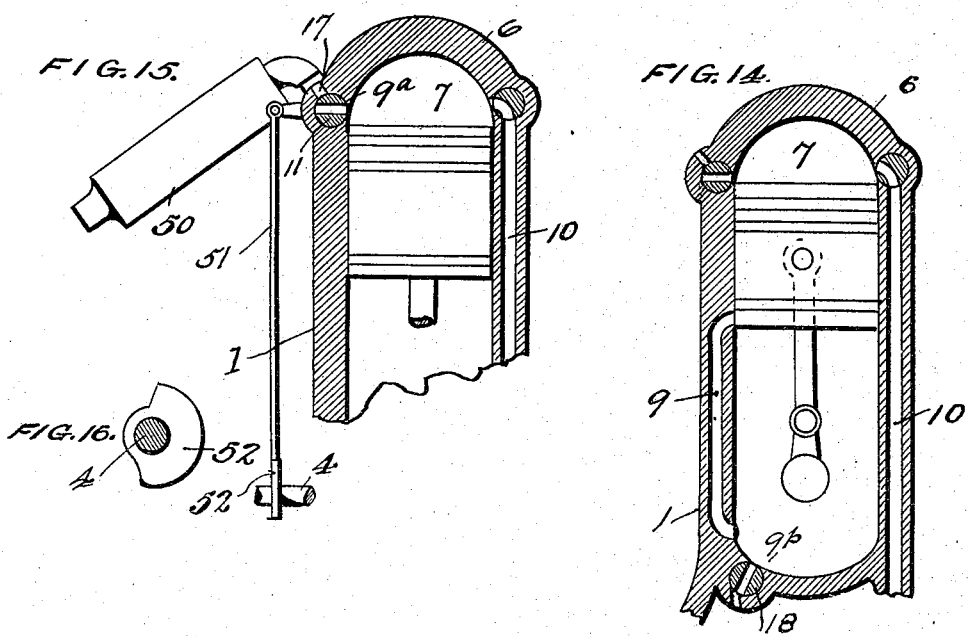

G. W. DONNING.
ENGINE.
APPLICATION FILED JUNE 18, 1909.
1,170,966.
Patented Feb. 8, 1916.
6 SHEETS—SHEET 6.
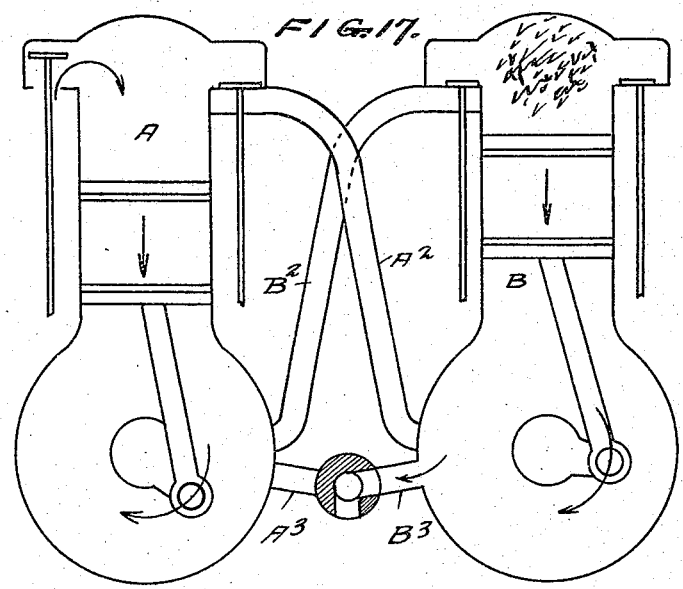
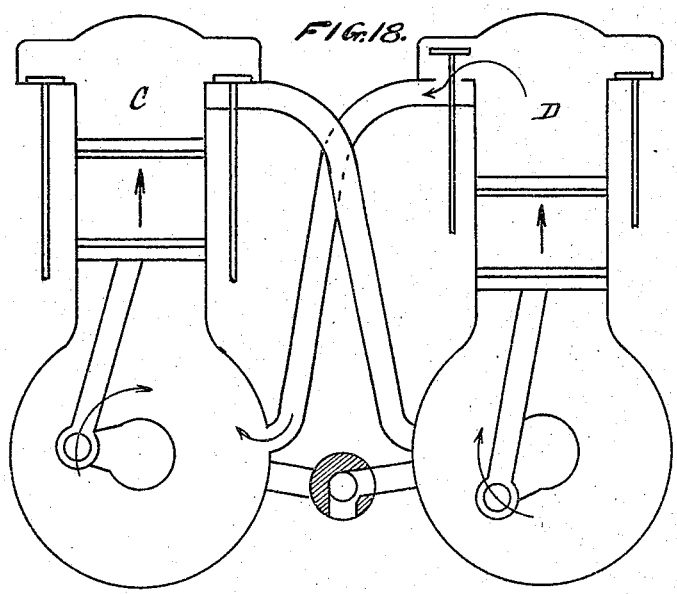
WITNESSES
C. K. Davies
James Atkins
INVENTOR
George W. Donning
by Edmund H. Parry
Attorney

UNITED STATES PATENT OFFICE.

GEORGE W. DONNING, OF STAMFORD, CONNECTICUT.

ENGINE.

1,170,966.   Specification of Letters Patent.   Patented Feb. 8, 1916.

Application filed June 18, 1909.   Serial No. 502,860.

*To all whom it may concern:*

Be it known that I, GEORGE W. DONNING, citizen of the United States, residing at Stamford, in the county of Fairfield and State of Connecticut, have invented certain new and useful Improvements in Engines, of which the following is a specification.

This invention relates to internal combustion engines.

The invention has several very important objects in view, and resides in novel structures and means for carrying these objects into effect.

In one aspect of the invention, the object is, broadly expressed, to conserve and further utilize certain of the motive fluid generated during a certain cycle of operation of the engine to return the piston to its starting or normal position.

Another object is to maintain the full force and effect of the explosion during the full stroke and then switch the motive fluid to the other end of the cylinder and there utilize the unexpended energy of such switched motive fluid to return the piston before the charge is exhausted, without creating a compression or vacuum by the movement of the piston.

Another object is to perfect the scavenging in the engine by permitting a full return of the piston to expel all of the old, impure and partially consumed mixture before a fresh mixture is admitted to the firing-chamber.

Still another object is to reduce to a minimum all back-pressure resulting (1) from compression of charges by the piston, (2) from the use of mufflers for muffling the noise of the exhaust, (3) from false firing due to premature ignition, and (4) from closing the exhaust-port before the piston reaches the limit of its stroke in either direction whereby it is caused to compress any fluid remaining in the cylinder, thus impeding the further movement of the piston,—which object is accomplished by my system of valves and the manner of operating the same, the method of injecting the charge, firing it when the piston is in its normal position, and switching and dividing the unexpended motive fluid at the completion of the work-stroke of the piston,—one part of the divided fluid being utilized to effect return of the piston, and the other part being exhausted, thereby removing all pressure on the inactive side of piston, such dividing of the fluid and further expansion thereof reducing it practically to atmospheric pressure at exhaust.

A still further object is to direct the motive fluid produced so that it may be applied to each side of the piston-head, alternately, from a common source of supply.

A further object is to utilize for a two-cycle type of engine a compressed-air apparatus for forcibly delivering the fuel into the firing-chamber of the cylinder at about thirty to fifty pounds pressure when crank nears the upper dead-center position,—thus avoiding compression of air or mixture in the cylinder by the action of the piston, the return stroke of the piston having been utilized to scavenge the cylinder; and which apparatus may also be utilized to effect a starting of the engine automatically.

Another object is to compress air in the air-compressor during the work-stroke thereof, whereby I utilize some of the motive fluid generated for the work-stroke and which energy is more than sufficient to produce the work-stroke since the pressure, at the time of exhaust, is considerably above atmospheric pressure, and, moreover, the piston encounters less resistance on the work-stroke than on the return-stroke, wherefore, that amount of motive fluid which I utilize for operating the compressor is more than offset by the fact that I reduce or eliminate all compression in the cylinder; and whereby a more constant revolution of the balance-wheel is permitted and effected.

A further object of the invention is to eliminate, with its attending disadvantages, false or back-firing, and which I accomplish by keeping the fuel without, that is, outside of, the piston-cylinder and controlling it without the cylinder until practically time for firing, so that, if the cylinder becomes heated, or the fresh charge (when injected) is set on fire, it is just at the time of ignition and of the work-stroke, so that it does no harm, anyway.

In general, therefore, it may be said that, in such a structure as I contemplate, I combine the important features and advantages of simplicity and durability, of reduction of weight of the balance-wheel, etc.; of unusual vibration by or to the engine; of absence of back-pressure at the exhaust; of simplifying muffling in all instances and, under certain conditions, obviating it entirely; of avoidance of false or back-firing either in the cylinder or in the crank-case and, consequently, of racking and jarring of the engine, with reduction of speed thereof; of reduction to a minimum of the power lost in compression and the attending strain on and racking of the piston, etc.; of avoidance of waste or loss of power and fuel; of production of a maximum of power in utilizing a minimum of cylinders; etc.

With these and other objects in view, the invention resides in various novel structures comprising, generally speaking, an engine-frame, a main source of motive fluid, means for directing such motive fluid, first to one side of a piston (or to one side of each of a plurality of pistons) and, then, to the other side thereof, and, at the same time relieving all pressure at the opposite side of the head, means for controlling such motive fluid, and means for exhausting.

Furthermore, the invention comprises means for directing and controlling the motive fluid whereby the engine may be caused to run under a momentum previously given to the balance-wheel, even after the operation of the engine is throttled, or fuel supply cut off, thereby utilizing the power inherent in the continuation of the rotation of the balance-wheel and other adjunctive parts.

Furthermore, the invention consists in novel means for clearing and clarifying the firing or explosion chamber after each ignition.

Furthermore, the invention comprises an engine wherein the mixture (preferably under pressure) is produced outside of, or without the engine-cylinder and injected into the firing-chamber at, or about, the commencement of the working-stroke, to eliminate false firing and its objectionable effects.

Furthermore, the invention consists in means for effecting a starting of the engine.

Furthermore, the invention resides in utilizing compressed air or other appropriate aeriform fluid to carry the fuel forward, to start the engine, and to scavenge the firing or explosion-chamber where steam is not utilized.

The invention resides, finally, in novel details of construction and arrangement of parts, all as particularly described hereinafter.

In the accompanying drawings, forming a part of this specification and in which like reference-characters indicate corresponding parts, and wherein I have illustrated one of many possible embodiments of my invention (others obviously being possible under the broadest aspects of my invention and as I contemplate it): Figure 1 is a view in elevation, mostly in vertical section, illustrating an application of my invention to an internal combustion-engine of the two-cycle type; Fig. 2 is a similar view of a modified form of firing-chamber; Fig. 3 is a view in end elevation of the engine shown in Fig. 1; Figs. 4. 4$^a$, 4$^b$ and 5 are diagrammatic views illustrating the relative positions of the piston and other operative parts during the cycle of movement thereof; certain of these figures showing forms of valves and valve-operating mechanisms different from those illustrated in Fig. 1—as, for instance, the check-valve appearing in Fig. 1, being omitted in these figures, and the operating mechanism for the valve which controls one of the vertically-extending channels, being of a modified form. Fig. 6 is a fragmentary view in detail of the governor for controlling the fuel-supply; Fig. 7 is a detail of the sparker-operating device; Fig. 8 is a detail of the cam and connecting-rod forming a part of the charge-switching and liberating mechanism; Fig. 9 is a detail of the cam attached to the eccentric carried at the right-hand end of the horizontal crank-shaft; Fig. 10 is a detail of one form of valve; Figs. 11 and 11$^a$ are detail views, in plan and front elevation, of a different form of valve; Fig. 12 is a vertical sectional elevation of a two-cylinder engine of the two-cycle type and embodying the principles of my invention; Fig. 13 is a vertical sectional elevation of a three-cylinder engine of the two-cycle type; Fig. 14 is a vertical sectional elevation of a modified form of two-cycle engine in which the piston operates as a cut-off valve device; Fig. 15 is a sectional elevation of a modification of the engine and wherein the exhaust is at the end of the work-stroke and before the return of the piston to normal position; Fig. 16 is a detail of the form of cam employed with the structure of Fig. 15; Figs. 17 and 18 are diagrammatic views of a four-cycle engine embodying my invention.

In these drawings: Referring, now, particularly to Figs. 1 to 10, and 14 and 15, the numeral 1 designates the cylinder (in this instance, a single cylinder) of a two-cycle type of engine. 2 designates the piston, of well-known form, and having piston-rings as usual, and carrying a depending connecting-rod or pitman 2$^a$, which connects at its lower end with the crank-shaft 4, the latter having fixed on one end, outside of the cylinder, a balance-wheel 5. The cylinder 1, in this instance, is provided with a dome-shaped top 6, (though this may be flat and the head of the piston concave shaped) the interior of which presents a chamber 7 which, for identification, I shall hereinafter refer to as the explosion-chamber or combustion-chamber. The dome may be enlarged to provide a larger chamber, or as shown in Fig. 2, the piston-section of the cylinder may be reduced so that, at the end of the work-stroke, the exploded mixture will have expanded less than usual, thereby bringing greater force against the opposite side of the piston when the force has been switched, (as hereinafter explained). Projecting into this chamber, as usual, is the igniting or sparking device 8, operated in a manner presently to be explained, and connecting with a suitable battery (not shown). There may be a plurality of these sparkers (as shown, for instance, in Fig. 1) operating simultaneously or in sequence. The cylinder, in this instance, may, if desired, be provided with cooling channels (not shown) after the usual style. Any other means for cooling, may, of course, be employed. Besides these cooling channels, I provide in (or outside of) the vertical walls of the cylinder a plurality of vertically-extending channels or conduits 9 and 10. The channel 9 is designed particularly to convey or "switch" the partially-expanded charge from the explosion-chamber 7 to a position below the piston 2, for reasons which will presently be explained. At the upper end of the channel 9, and at the point $9^a$ where it leads from the explosion-chamber, is a valve 11, which may be of any of the forms shown in detail in Figs. 10, 11 and $11^a$ and operated by means of a valve-rod 12 pivoted to an arm $11^a$ on said valve, and, at its lower end carries a roller $12^a$ arranged to travel preferably in a cam 13 mounted on the shaft 4, as shown in Fig. 8. In lieu of the cam, an eccentric may be used, as well understood. Intermediate of its ends, the valve-rod works in a pivoted guide 14 supported on a bracket or lug 15.

The valve 11 is adapted to have three operative positions, to wit: (1) a normal position where it closes the openings $9^a$ against passage of the motive fluid in either direction, for switching or exhaust; (2) a lower open position to open the opening $9^a$ to permit passage of the motive fluid into the channel 9; and (3) the upper open position to open the opening $9^a$ to permit exhaust. This valve is positioned by the cam 13 which, as shown, has three operating points, $13^a$, $13^b$ and $13^c$, respectively, corresponding to the position of the valve when acting to close, or to switch, or to exhaust, respectively.

Contiguous to the opening $9^a$ from the explosion-chamber, and, preferably above the center of the valve 11, is an exhaust-port 17 also leading from the explosion-chamber 7 to outside of the cylinder. This port is controlled by the valve 11 which also controls the opening $9^a$.

The channel 9 for switching may, in some instances, be entirely separate from the exhaust and be covered and uncovered by the action of the piston, as shown in Fig. 14.

At the point $9^b$ where the channel 9 opens into the lower portion of the cylinder 1, there is disposed a valve 18, shown in detail in Fig. $11^a$.

In Fig. 10, I have shown a modified form of valve, in this instance, comprising a body-portion $18^a$, and cylindrical end-portions $18^b$, the body-portion being, in this instance, provided with a depression $18^c$. An arm $18^d$ is mounted at one end of the valve and is provided with an opening $18^e$, for pivotal connection with a link 19 connecting with cam $13^x$ carried by the shaft 4 and shown in Fig. 4; or as partly shown in Fig. 1, the link 19 may be provided with a roller on the free end which will engage with the balance-wheel.

The channel 10 at the opposite side of the cylinder leads from a carbureter 20 (disposed at the lower portion of the engine-frame) to the explosion-chamber. At the point $10^a$ where it opens into said chamber, the channel is controlled by a valve 21, (which may be of either of the forms illustrated in Figs. 10 and $11^a$) and from which extends an arm 22 carrying a finger 23 by which the valve may be operated by hand in starting the engine, as hereinafter described. Said arm has pivoted to it a valve-rod 24 which is engaged intermediate of its ends by a guide 25 pivoted on a bracket 26 on the outside of the cylinder. The lower end of the valve-rod carries a roller 27 which engages a cam 28 attached to an eccentric 29 fixed on shaft 4. A spring 30 encircles the valve-rod, and serves to maintain the roller 27 in engagement with its cam. In this instance, the valve-rod 24 is provided with a limit-stop $24^a$ which abuts against the guide 25 to prevent the roller from going below the working-face of the cam. These valve-rods 12 and 24 and cams 13 and 28 are shown in Figs. 8 and 9, respectively.

As a means for operating the sparker-device 8, in this instance, I utilize the arm 22 to actuate a spring-controlled plunger 31, operatively disposed in an orifice 32 in the dome 6 of the cylinder, as shown in Figs. 4 and 7, and momentarily engaging the stationary negative pole 33 also mounted in the dome. To cushion the plunger 31 at its outer end where it abuts against the arm 22, I provide a resilient member $22^a$. Upon retraction of the plunger, the spark is produced to ignite the mixture. It will be understood that this action is governed by the movement of the valve-rod 24 which, in turn, is operated by cam 28, these operations being simultaneous with the closing of the inlet-valve 21.

Disposed contiguous to the cylinder and, in this instance, beneath the crank-shaft, is an air-compressor 34 of any appropriate design, and adapted to supply compressed-air for the charge-mixture, and automatically to start the engine, as presently to be described.

The compressor is provided with a compression-indicator 34ª, as shown in Fig. 1. This compressor is operated by the eccentric 29 through the connecting-link 35 pivotally connected to the under face of the eccentric, and, at its lower end, to the plunger 36 of the compressor. It is to be understood that the parts are so arranged relatively that the compression of the air in the compressor is effected during the working-stroke of the piston, at which time there is a surplus of energy existing and working on the piston, and this is actuated nearer the point where the shaft is at its central position.

Leading from the compressor is a pipe-connection 37 which extends through the lower end of the cylinder and into the space therein beneath the piston. This connection is provided with a valve 38 for controlling the flow of air into the cylinder. Between this valve 38 and the compressor is a shunt-pipe 39 leading into the carbureter 20. By this means, air under pressure is supplied to the carbureter for atomizing the fluid and for delivering the same, under pressure, into the channel 10 and through the valve 21 into the explosion-chamber 7. In some instances, I may dispose a plunger or clapper valve 10ᵇ in the channel 10, (for instance, contiguous to the valve 21, Fig. 1) the function of which would be to act as a safety-valve in the event that the valve 21 did not operate properly, and in this way there can be no back-firing to the carbureter, as frequently occurs in present-day constructions. The pressure of the mixture beneath this valve 10ᵇ would keep it open; but, in the event of false firing while valve 21 is open, the clapper would be forced shut by the greater pressure due to the expansion of the ignited mixture.

To start the engine automatically, as aforementioned, the operator lifts the finger-member 23, thereby opening the valve 21 to permit the mixture under pressure to enter the explosion-chamber, whereupon, by a quick release of the finger-piece, and the consequent retraction of the spring-pressed plunger 31, a spark is produced for igniting the charge just supplied to the explosion-chamber, whereupon the piston will be driven in the direction of its work-stroke and the engine is thus started. In the event that this should not operate the engine, the valve 38 in the bottom of the cylinder is opened to permit the compressed air to enter the cylinder and lift the piston to an operative position, when it can be actuated by the explosion. In the meantime, the valve 38 is closed, that is when the piston shall have reached its operative position and the exhaust-valve 18 opens, relieving the piston of the air-pressures. By means of this feature, of introducing an aerated medium, in the form of air or aerated gas, I am enabled to automatically effect movement of the piston and to force it beyond dead center to start the engine. In this way, I obviate the necessity of cranking the engine, as usually done to start it.

The fuel supply, (in this instance gasolene), is stored in the tank 40, and maintained under pressure, the tank 40, for this purpose, being connected to the compressor 34 by a pipe 41 which is provided with a cock for momentarily cutting off flow of air while the tank is being refilled with the gasolene. The fuel-pipe 42 begins at a point near the bottom of the tank 40 and extends upward into the carbureter 20. Adjacent to the tank, in this instance, is a valve 43 in said pipe 42 for controlling the supply of fuel to the carbureter, the valve being operated by a pivoted connecting-arm 44 which is forked at its end to engage with a slidable collar 45 encircling a shaft of the governor 46. On said shaft is a gear 47 meshing with gear-teeth 48 formed on the balance-wheel 5. It will be understood that, if said balance-wheel attains too great speed, it will, through the connections between it and the governor, rotate the governor sufficiently to cause the weighted members thereof to lower by reason of centrifugal action, and this will lower the collar and rock the connecting-arm 44 and thereby close the valve 43 to shut off the supply of fuel, thus permitting the air only to enter.

On the pipe 42 is a controlling valve 49 by which I am enabled to regulate, to a well-defined degree, the desired flow of fuel from the tank. This valve may also be utilized to shut off the supply therefrom entirely.

In Fig. 15, I have illustrated a modification of the form of engine shown in Fig. 1. The modification consists in omitting the channel 9 which leads from the explosion-chamber to the space within the cylinder below the piston, and in lieu thereof mounting a muffler device adjacent the opening 9ª which leads from the explosion-chamber and which opening is controlled by the valve 11. In this instance, the charge (after the explosion and the completion of the full work-stroke of the piston effected by the explosion) is liberated into the muffler 50. The valve 11 is operated, in this instance, by a pitman 51, the lower end of which engages the cam 52 carried by the crank-shaft, and the pitman rides on the high side of the cam during the return stroke of the piston, thus operating the valve 11 into exhaust position.

In the foregoing, I have described what I believe to be a novel form of a two-cycle engine, and one which is practical. It is well known that, heretofore, there have been serious objections raised against the use of a two-cycle engine or motor, notwithstanding the many advantages of this particular type of engine or motor. These objections have been largely on the score that the operation of this particular type of engine entails a loss of energy and speed, and an increased use of fuel inducing back-firing, these being due also to faulty construction. These objections have seriously operated against its wide adoption for motor cars and launches particularly. In the construction which I have devised, I have not only eliminated these objectionable features, but, in addition, I have actually increased the speed, efficiency and energy of the two-cycle type of engine and, at the same time, have reduced the quantity of fuel to less than that which is now required in engines of either type having equivalence of horse-power. Moreover, I have also achieved other valuable results, namely, the elimination of all piston-compression in the crank-case or firing-chamber, premature ignition, back-firing, and back-pressure, with attending wear and damage to the working parts and interference in speed of the engine. The mixture passing through the channel is heated more or less which would facilitate rapid ignition, but the walls of the channel, on account of the cooling process, are not permitted to overheat and effect an ignition of the mixture; furthermore, there is no burning of the gas in the chamber, and, therefore, there is no carbonaceous matter to hold the fire. The mixture or charge, after leaving the carbureter, passes (preferably) through an orifice in the wall of the cylinder (instead of by an outside pipe), so that the charge may be heated somewhat before being injected into the firing-chamber, thereby increasing the rapidity and certainty of ignition.

An important feature of my invention is to obtain the maximum amount of power from a motor of minimum weight; and, as only about one-fifth of the heat-units consumed are, in the present-day engines, utilized or given up in the form of work, and as the remaining heat-units are usually exhausted into the atmosphere, my invention with this feature constitutes an improvement in this respect, the arrangement being such (as already explained) as to permit the exploded mixture to develop its heat-units and perform its function to the greatest extent possible before exhausting. As a result of the utilization of the power, the weight of the balance-wheel may be reduced considerably.

As the pressure or expansion increases with the rise in temperature, and as the temperature (at the moment of ignition) is approximately, 2700° F., and continues to increase until the moment of exhaust, the further consumption of the charge will partially compensate for the increased space caused by the outward movement of the piston, so that, at the time of exhaust, there is usually a great waste of power in present-day constructions. This waste amounts, approximately, to 248,804 pounds, or over 7.5 horse-power per pound of fuel-gas going through the exhaust. It is the utilization of this waste energy (or a great part of it) that I seek to attain.

In Figs. 4, 4$^a$, 4$^b$ and 5 I have illustrated, in diagrammatic form, approximately the relative positions of the piston and other operative parts during the cycle of movement thereof; and from these and the foregoing detailed description, I believe the operation of my two-cycle type of engine will be perfectly clear: In Fig. 4, the piston appears in practically its uppermost position, it having only to travel the distance indicated by the full and dotted lines, which additional travel would carry the crank-shaft to the dead-center position indicated by the dotted lines. The valve 21 is open to permit the mixture (previously compressed) to enter the explosion-chamber, the valve 11 is closed, and the valve 18$^2$ is open to permit egress of any air or gas that may then be in the lower part of the cylinder and which might interfere with the free downward movement of the piston after the explosion.

In Fig. 4$^a$ the piston has reached its uppermost position, the crank-shaft is at dead center, the valve 21 is closed to shut off further supply of the mixture to the explosion-chamber, and the explosion is being effected by the sparker. The valve 11 is still closed and the valve 18 is still open.

In Fig. 4$^b$ the explosion has occurred, the piston has nearly completed its work-stroke and valve 21 is still closed, but valve 11 has now been opened, and valve 18 has been closed for the exhaust, but, at the same time, has been moved into a position to present a free opening from the lower end of the channel 9 into the power part of the cylinder. In the operation of the piston caused by the explosion the balance-wheel has been given momentum. The position of the parts has thus become such that the exploded mixture can in part escape from the explosion chamber and through the channel 9 into the lower part of the cylinder beneath the piston. While the crank-shaft is passing beyond the lower dead-center position, the exploded mixture (which has been allowed to escape from the upper to the lower section of the cylinder) is utilized to raise the piston to its initial or starting position.

In Fig. 5, the valve 11 has been operated to shut off passage of what remains of the exploded mixture into the channel 9, and moved to register with the exhaust-port 17 which permits whatever mixture is remaining in the explosion-chamber (as well as any gas, air, or anything that would interfere with the free upward movement of the piston) to escape therefrom into the atmosphere. In this way the explosion-chamber is thoroughly scavenged.

It will be understood that, when the parts are in the position indicated in Fig. 4$^b$, the pressure against both sides of the head of the piston is, for an instant of time, equalized, but, thereupon, the exhaust-port 17 is (as shown in Fig. 5) opened for the purpose of relieving all pressure, and the other valves 18 and 21 are closed so that the motive fluid remaining at the opposite side of the piston may be utilized to restore the piston to its original position, the latter at the same time scavenging the firing-chamber; and the second exhaust is permitted by the opening of the valve 18 to register with the exhaust-port 18$^x$, this being effected while a new charge is being injected into the firing-chamber, as in Fig. 4.

It will be seen (1) that I have utilized the force of the explosion during the entire work stroke; (2) that I have utilized a large part of the exploded mixture to return the piston to starting position, the remainder being greatly expanded and, thus, greatly exhausted on return of the piston; (3) that I have eliminated piston-compression, back and false-firing, etc., and (4) that I have reduced (by further work) the unused exploded mixture practically to atmospheric pressure, and, in this condition, liberated it into the atmosphere with practically no noise, obviating in many instances the necessity for using a muffler with its back-pressure results. Where extraordinary explosions are required in the engine, a very small muffler can, of course, be used if desired. The muffler as now marketed reduces the efficiency of the engine and this is due to back-pressure and, what I regard as, premature exhausting of the power, instead of utilizing it as I have described until it is practically reduced to atmospheric pressure.

In Fig. 13, I have illustrated a three-cylinder engine of the two-cycle type embodying my invention, and in which the arrangement is similar to that described in connection with the one-cylinder engine of Fig. 1, except that, in this instance, the dividing of the motive fluid occurs when the piston $a'$ is in its lowermost position and after it has passed beyond and, thus, uncovered the mouth $a^2$ of the channel $a^3$ which leads from the cylinder $a^4$ to the cylinder $a^5$, at which moment the motive fluid is equally distributed in these two cylinders, and the piston $a^6$ is moving downwardly and being assisted by the motive fluid which has been conveyed into the cylinder $a^5$ from the cylinder $a^4$. As the piston $a'$ commences its return-stroke, the mouth $a^2$ is closed thereby, and, simultaneously, an exhaust-valve $a^7$ is opened to permit exhaust from the explosion-chamber of the cylinder $a^4$. In the meantime, a valve $a^8$ which controls the passage of the motive fluid through the channel $a^9$ remains closed, but is opened the instant that the piston $a'$ arrives in normal or starting position. Simultaneously with the opening of the valve $a^8$, the exhaust-valve $a^7$ is closed, and, after the mixture has been injected into the explosion-chamber of the cylinder $a^4$, the valve $a^8$ is again closed, and, at the same instant therewith, the mixture is ignited. When the piston $a^6$ begins its upstroke, the two-way exhaust-valve $a^{10}$ is opened to permit exhaust from the upper part of the cylinder $a^5$ into the atmosphere. Communicating between the cylinder $a^5$ and a cylinder $a^{11}$ is a channel $a^{12}$, the mouth $a^{13}$ thereof being controlled by the movement of the piston $a^{14}$ which operates in the cylinder $a^{11}$, and which piston $a^{14}$ is actuated by the explosion of the mixture injected into the cylinder $a^{11}$ by the channel $a^{15}$ which connects with the carbureter $a^{16}$, a valve $a^{17}$ controlling the passage of the fuel therethrough. When the piston $a^{14}$ is in its lowermost position, the mouth $a^{13}$ of the channel is uncovered, permitting the unexpended motive fluid to enter the cylinder $a^5$ on the underside of the piston which has just uncovered the lower end $a^{18}$ of the channel $a^{12}$, whereupon the motive fluid under the piston $a^6$ assists in raising the same. It will be understood that the piston $a^{14}$ during its upstroke closes the channel $a^{12}$, and, simultaneously, the two-way valve $a^{10}$ is opened to permit exhaust from the upper part of the cylinder $a^{11}$. In the lower portion of the central cylinder $a^5$ is provided an exhaust-valve $a^{19}$ which, when the piston is being raised, is closed, and, when the piston is descending, said valve is opened. The several valves are operated by pitmans connecting therewith and with cams mounted on the crank-shaft $a^{20}$, the working-faces of the cams being adapted to produce the required results, and in the manner fully described with reference to the pitmans and cams in the structure in Figs. 1 and 4. In this form, therefore, the motive fluid is liberated into its neighboring cylinder to assist in operating the piston thereof. In this instance, the two end cylinders feed into the middle cylinder, the one at the top of the piston and the other below the bottom of the piston alternately. The cranks of the shaft will, of course, be relatively arranged approximately as shown in Fig. 13; that is to say, the two outer cranks will occupy their high and low positions, relatively, and the middle crank will occupy an intermediate position. The said outside cylinders are provided with explosion chambers in the dome, while the central one is not so provided. The mixture is therefore not supplied to the middle cylinder, but it receives its operating power in the form of exploded but unexpended mixture from the two side cylinders, as already explained. These two side cylinders are, as already explained, provided with fuel-supply passages or channels $a^9$ and $a^{15}$ receiving their supply from a source similar to that described in connection with Fig. 1.

In Fig. 12, I have shown the invention applied, (in a manner similar to that described with reference to the structure of Fig. 1) to a two-cycle type of a two-cylinder engine. In this form, are combined two cylinders operating, conjointly, in the manner already specified in connection with the form illustrated in Fig. 1, except that, when the piston $a^{21}$ is in its starting position, the other piston $a^{22}$ is at the completion of downward (switching) stroke. The conducting channels $a^{23}$ and $a^{24}$ are disposed at opposite sides of the respective cylinders, and the switching channels $a^{25}$ and $a^{26}$ are located in the adjacent sides of the cylinders so as to have the exhaust-valves $a^{27}$ and $a^{28}$ in relative positions, one to the other, so as to control the exhaust through a common exhaust-pipe (not shown). Each cylinder is provided with a valve $a^{29}$ to control the passage of the mixture through the channels $a^{23}$ and $a^{24}$. Each of the explosion chambers of the cylinders is provided with an exhaust-port $a^{30}$ which is controlled by a valve $a^{31}$. These several valves are operated by valve-rods and cams, not shown but corresponding in structure and position to those illustrated in Fig. 1. It will be understood that the operation of this form is similar to that explained with reference to the form of Fig. 1, each cylinder being in operation alternately.

In Figs. 17 and 18, I have shown, in diagrammatic form, a four-cycle engine embodying my invention and as applied to an engine comprising two or four cylinders: It will be seen that I have incorporated, in this instance, the same principles as those which characterize the embodiment in the two-cycle type of engine. In this four-cycle embodiment, there is the usual suction-stroke, compression-stroke, working-stroke and exhaust-stroke whereby the mixture is respectively sucked or injected into the cylinder, then compressed, then ignited to cause the work-stroke and, finally, exhausted.

In Fig. 17 I have shown how two of the four cylinders may conveniently be inter-related, to permit the liberation of the exploded mixture from one cylinder into the other, respectively, from the upper part of one into the lower part of the other whereby such liberated mixture may be utilized to aid in raising the piston, not for exhaust, but for effecting compression, etc. A convenient means for conveying the exploded mixture from the cylinder A to cylinder B is the pipe $A^2$; and from the cylinder B to cylinder A, a pipe $B^2$. For final exhaust from these cylinders, pipes $A^3$ and $B^3$ may conveniently be arranged in the lower part of the cylinder and extend into a common exhaust pipe.

In Fig. 18, the cylinders C and D are similarly connected. It is to be understood that valves for controlling the passage of the fuel or mixture into and out of the cylinders may be provided and may be in the form already described in connection with the two-cycle type of engine and be timed to operate as appropriate for the four-cycle type, or, the commercial form, now in engines of this character, may be utilized.

A single four-cycle engine might not be altogether practical, by reason of the long intermission between impulses, but two four-cycle engines, with my feature of switching the power, would be entirely practical, and as illustrated in said Figs. 17 and 18. Multiples of two would likewise be practical. Of course, a single four-cycle cylinder could be employed though the impulse from the switched motive fluid would act only on the piston every second revolution. Therefore, by employing two (or its multiples) four-cycle cylinders, I can switch the motive fluid to the underside of the pistons in opposite cylinders. In the forms of structure shown in Figs. 1, 4, $4^a$, $4^b$ and $4^c$, I may, if preferred, switch to the under-side of each individual cylinder-piston.

The governor, carbureter, air-tank and gasolene-tanks may, for various exigencies, be placed elsewhere than in the base of the engine, as shown.

Herein, I have employed the expressions, "power," "force" and "energy." It is to be understood that such expressions wherever used, are intended to comprehend that element of operating or working force which is capable of being utilized, when generated, to effectuate the functions of the movable parts of my engine.

It is to be understood that, broadly speaking, the invention is not limited to specific details except in so far as such limitations may be specified in the claims.

Having now fully described my invention and its mode of operation, what I claim and desire to secure by Letters Patent is:

1. In an engine, a cylinder and a single piston working therein, a power-producing chamber within the cylinder and arranged at one side of the piston, a secondary chamber within the cylinder and arranged at the opposite side of the piston, a channel for directing a motive fluid directly from one chamber to the other whereby said fluid operates upon and actuates said piston at every cycle thereof, said channel extending directly between said chambers and substantially parallel with the cylinder and piston, valve mechanism timed to operate during the return-stroke of the piston to normal position to release unused gases from the power-producing chamber and, thus, reduce pressure thereof on the piston, and means for operating said valve-mechanism in relation to the position of the piston.

2. In an engine, a cylinder, a single piston working therein, firing and piston-returning chambers within the cylinder and located at opposite sides of the piston, a connection between said chambers formed within the engine-frame and housed thereby and extending throughout its length longitudinally of the cylinder and substantially parallel with the direction of movement of the piston, valve-mechanism timed to operate during the return stroke of the piston to normal position to exhaust the unused gases from the firing-chamber, means for actuating said valve-mechanism, and means for supplying a firing-mixture to the firing-chamber.

3. In an engine, a cylinder, a piston working therein, a firing-chamber within the cylinder and disposed at one side of said piston, a piston-returning chamber within the cylinder and at the opposite side of said piston, a stationary abutment-surface located in said piston returning chamber, a connection formed within and housed by the engine-frame and extending directly between said chambers and longitudinally of the cylinder and substantially parallel with the direction of movement of the piston whereby, when the piston moves away from the firing-chamber, the motive fluid generated therein is switched directly to the piston-returning chamber and between the lower face of the piston and said abutment-surface for effecting the return of the piston to normal position, means for supplying a firing-mixture to said firing-chamber, and means for controlling the passage of the mixture into said piston-returning chamber before said piston completes a return-stroke in its cycle of movement, and means for exhausting the unused gas from the firing-chamber during said return-stroke of the piston to eliminate pressure thereof on the piston.

4. In an engine, a cylinder, a single piston working therein, a firing-chamber within the cylinder and disposed at one side of said piston, a piston-returning chamber within the cylinder and at the opposite side of said piston, a connection formed within and housed by the engine-frame and extending directly between said chambers and longitudinally of the cylinder and substantially parallel with the direction of movement of the piston whereby, when the piston moves away from the firing-chamber, the motive fluid generated therein is switched directly to the piston-returning chamber for effecting the return of the piston to normal position, means for supplying a firing-mixture to said firing-chamber, means for controlling the passage of the mixture into said piston-returning chamber before said piston completes a return-stroke in its cycle of movement, and means for exhausting the unused gas from the firing-chamber during said return-stroke of the piston to eliminate pressure thereof on the piston, a balance-wheel adapted to cause momentum by the operation of the engine, and means for relieving head-pressure in the firing-chamber.

5. In an engine, a cylinder, a single piston working therein, a firing-chamber within the cylinder and disposed at one side of said piston, a piston-returning chamber within the cylinder and at the opposite side of said piston, a connection formed within and housed by the engine-frame and extending directly between said chambers and longitudinally of the cylinder and substantially parallel with the direction of movement of the piston whereby, when the piston moves away from the firing-chamber, the motive fluid generated therein is switched directly to the piston-returning chamber for effecting the return of the piston to normal position, means for supplying a firing-mixture to said firing-chamber, means for controlling the passage of the mixture into said piston-returning chamber before said piston completes a return-stroke in its cycle of movement, and means for exhausting the unused gas from the firing-chamber during said return-stroke of the piston to eliminate pressure thereof on the piston, a balance-wheel adapted to cause momentum by the operation of the engine, and a crank-shaft upon which said balance-wheel is mounted and which is connected to the piston.

6. In an engine, a cylinder and a single piston working therein, a firing-chamber within the cylinder and disposed at one side of said piston, a piston-returning chamber within the cylinder and at the opposite side of said piston, a channel formed within and housed by said cylinder and directly extending from one chamber to the other and longitudinally of the cylinder and substantially parallel with the direction of movement of the piston whereby, when the piston moves away from the firing-chamber, the motive fluid generated therein is switched directly to the second chamber for effecting return of the piston to normal position, means for supplying an explosive mixture to the firing-chamber, a crank-shaft connecting with the piston, a balance-wheel mounted on the crank-shaft and receiving momentum by the action of the piston, devices for controlling the passage of mixture into said piston-returning chamber before said piston completes a return-stroke in its cycle of movement, and means for exhausting the unused gas from the firing-chamber during said return-stroke of the piston to eliminate pressure thereof on the piston, and mechanism carried by said crank-shaft and connecting with said controlling devices for actuating the same automatically.

7. In an engine, a cylinder and a single piston working therein, a firing-chamber within the cylinder and disposed at one side of said piston, a piston-returning chamber within the cylinder and at the opposite side of said piston, a channel formed within and housed by said cylinder and directly extending from one chamber to the other and longitudinally of the cylinder and substantially parallel with the direction of movement of the piston whereby, when the piston moves away from the firing-chamber the motive fluid generated therein is switched directly to the second chamber for operating upon and effecting return of the piston to normal position, means for supplying an explosive mixture to the firing-chamber, a crank-shaft connecting with the piston, a balance-wheel mounted on the crank-shaft and receiving momentum by the action of the piston, and devices for controlling the passage of mixture into and out of said chambers, mechanism carried by said crank-shaft and connecting with said controlling devices for actuating the same automatically, and means for exhausting unused mixture from said firing-chamber substantially as the piston begins to return to normal position and thereby relieve pressure thereon within the piston-chamber.

8. In an engine, a cylinder and a single piston working therein, a firing-chamber within the cylinder and disposed at one side of said piston, a piston-returning chamber within the cylinder and disposed at the opposite side of said piston and in longitudinal alinement with said firing-chamber, a channel formed within and housed by said cylinder, said channel extending longitudinally of the wall of the cylinder and substantially parallel with the direction of movement of the piston therein and communicating directly with said chambers for the passage of the motive fluid generated within the firing-chamber from the firing-chamber to the piston-returning chamber, means for controlling the passage of the motive fluid from the firing-chamber into said channel, an exhaust port disposed contiguous to and controlled by said means, said means operating to open the port for exhausting unused gases from the firing-chamber as the piston begins its return-stroke, an exhaust port in said piston-returning chamber, and a controlling device for said exhaust port.

9. In an engine, a cylinder and a single piston working therein, a firing-chamber within the cylinder and disposed at one side of said piston, a piston-returning chamber within the cylinder and disposed at the opposite side of said piston and in longitudinal alinement with said firing-chamber, a channel formed within and housed by said cylinder, said channel extending longitudinally of the wall of the cylinder and substantially parallel with the direction of movement of the piston therein and communicating directly with said chambers for the passage of the motive fluid generated within the firing-chamber from the firing-chamber to the piston-returning chamber, means for controlling the passage of the motive fluid from the firing-chamber into said channel, an exhaust port disposed contiguous to and controlled by said means, said means operating to open the port for exhausting unused gases from the firing-chamber as the piston begins its return-stroke, an exhaust port in said piston-returning chamber, a controlling device for said exhaust port, and means for actuating said controlling devices.

10. In an internal combustion chamber, a cylinder and the piston working therein, a firing-chamber within the cylinder and disposed at one side of said piston, a piston-returning chamber within the cylinder and at the opposite side of said piston, a channel extending from the firing-chamber, said channel extending longitudinally of the wall of the cylinder and substantially parallel with the direction of movement of the piston therein, to the piston-returning chamber, a valve at the mouth of said channel for controlling passage of a motive fluid from the firing-chamber into said channel, an exhaust port in said piston-returning chamber, the passage through said port being controlled by the aforementioned valve, means for operating said valve to open it and exhaust unused gases from the firing-chamber approximately as the piston begins the return-stroke in its cycle of movement, a crank-shaft to which said piston is connected, a balance-wheel carried by said crank-shaft, and an air-compressor leading to said chambers for normally housing a pressure medium adapted, when released, for raising the piston to normal position and for forcing a mixture into the firing-chamber.

11. In an internal combustion engine, a single elongated cylinder and the single piston working therein, a crank-shaft connecting with the piston, a firing chamber external of the piston, a piston-returning-chamber, formed in said cylinder at the side of the piston opposite the firing chamber, means for injecting a mixture into the cylinder, means for firing the same, and means for switching part of the motive fluid produced thereby into the piston-returning-chamber, including an elongated channel connecting said chambers and extending longitudinally of the wall of the cylinder and substantially parallel with the direction of movement of the piston therein, and means for exhausting the unused mixture from the firing chamber approximately as the piston begins its return-stroke.

12. In an internal combustion engine, a single elongated cylinder, a single piston working therein, a crank-shaft connected with the piston, firing and piston-returning-chambers disposed at opposite sides of the piston within the cylinder, means for introducing a mixture on one stroke of the piston, means for firing the mixture on another stroke thereof, and a channel formed within the wall of said cylinder and extending longitudinally thereof and in substantial parallelism with the direction of movement of the piston therein, means for switching the motive fluid produced by the explosion of the mixture at the end of the last-mentioned stroke and utilizing the same to effect a returning of the piston to noraml position and means for exhausting unused gases from the firing-chamber practically as the piston begins its return-stroke.

13. In an internal combustion engine, a single elongated cylinder, a single piston working therein, a crank-shaft connecting with the piston, a firing chamber and a piston-returning chamber at opposite sides of the piston within the cylinder, and a channel formed within the wall of said cylinder and extending longitudinally thereof and in substantial parallelism with the direction of movement of the piston therein, means for introducing a mixture into the cylinder and then firing it, and means for switching the unexpended motive fluid of the mixture at the end of a stroke of the piston to effect its return to starting position and means for freeing the firing-chamber from gases substantially as the piston begins its return-stroke.

14. In an internal combustion engine, a cylinder and a piston working therein, firing and piston-returning-chambers within the cylinder and disposed at opposite sides of the piston, a fuel-mixing and compressing device disposed remotely from said firing-chamber, a switching channel formed within and housed by said cylinder and directly connecting said chambers, and extending longitudinally of the wall of said cylinder and substantially parallel with the direction of movement of the piston in said cylinder, means for controlling the passage through said channel, a fuel-conducting channel leading to said firing chamber, means for introducing the mixture under pressure to said firing chamber, and means for firing said mixture in the firing-chamber to produce a motive fluid acting first against the piston to actuate the same and, then, passing through said channel directly into the piston-returning chamber to act against the opposite side of said piston to effect its return.

15. In an internal combustion engine, a cylinder and a piston working therein, firing and piston-returning-chambers within the cylinder and disposed at opposite sides of the piston, a fuel-mixing and compressing device disposed remotely from said firing-chamber, a switching channel formed within and housed by said cylinder and directly connecting said chambers, and extending longitudinally of the wall of said cylinder and substantially parallel with the direction of movement of the piston in said cylinder, means for controlling the passage through said channel, a fuel-conducting channel leading to said firing chamber, means for introducing the mixture under pressure to said firing chamber, and means for firing said mixture in the firing-chamber to produce a motive fluid acting first against the piston to actuate the same and, then, passing through said channel directly into the piston-returning-chamber to act against the opposite side of said piston to effect its return, and means for controlling passage through said last-mentioned channel.

16. In an internal combustion engine, a cylinder and a piston working therein, firing and piston-returning-chambers within the cylinder and disposed at opposite sides of the piston, a fuel-mixing and compressing device disposed remotely from said firing-chamber, a switching channel formed within and housed by said cylinder and directly connecting said chambers, and extending longitudinally of the wall of said cylinder and substantially parallel with the direction of movement of the piston in said cylinder, means for controlling the passage through said channel, a fuel-conducting channel leading to said firing chamber, means for introducing the mixture under pressure to said firing chamber, means for firing said mixture in the firing-chamber to produce a motive fluid acting first against the piston to actuate the same and, then, passing through said channel directly into the piston-returning-chamber to act against the opposite side of said piston to effect its return, and means for controlling passage through said last-mentioned channel, and means for exhausting from said chambers at predetermined times.

17. In an engine, a cylinder, a piston, a plurality of chambers disposed at opposite sides of said piston, means for introducing a motive fluid into the cylinder and utilizing the same to actuate the piston, and means for switching and for dividing the fluid whereby one portion of such divided fluid may operate against the piston to actuate it in one direction while the other portion is liberated for impingement against the opposite side of said piston and utilized or exhausted, as desired, and means for liberating the portion of the fluid remaining above the piston when the piston is rising.

18. In an engine, a cylinder, a piston, a plurality of chambers disposed at opposite sides of said piston, means for introducing a motive fluid into the cylinder and utilizing the same to actuate the piston, means for switching and for dividing the fluid whereby one portion of such divided fluid may operate against the piston to actuate it in one direction while the other portion is liberated for impingement against the opposite side of said piston and utilized or exhausted, as desired, an igniter for firing the mixture, and separate means for exhausting on both strokes of the piston.

19. In an engine, a cylinder provided with a firing-chamber of enlarged capacity, a piston, means for introducing a motive fluid into said cylinder and utilizing the same to actuate the piston, means for switching and for dividing the fluid, whereby one portion of such divided fluid may operate against the piston to actuate it in one direction while the other portion is liberated for impingement against the opposite side of said piston and utilized or exhausted, as desired, an igniter for firing the mixture, and separate means for exhausting on both strokes of the piston.

20. An engine, a plurality of cylinders, a corresponding number of pistons working therein, firing and piston-returning chambers in each cylinder and at opposite sides of each piston, a crank-shaft common to all of the pistons, means for producing a motive fluid in the cylinders, and means for dividing and switching the fluid to each of the piston-returning chambers to actuate the respective piston while the part remaining in the firing-chamber is liberated or further utilized to avoid a retarding movement of the piston.

21. In an engine, a cylinder, a piston, a crank-shaft, a compressor disposed in juxtaposition to the cylinder, means carried by the shaft and coöperating with the compressor, and adapted to effect compression in the compressor on the work-stroke of the piston, means for preventing compression in the cylinder by the piston on the return-stroke of the piston, and means including a valve for preventing the production of a vacuum on the underside of the piston.

22. In an engine, a cylinder, a crank-shaft, a piston attached thereto, igniting means, means located at the firing-portion of the cylinder for exhausting at the end of the work-stroke of the piston and during completion of its return-stroke for scavenging the cylinder, means for injecting an explosive mixture under pressure into the cylinder when the piston is about to commence its work-stroke, that is, just before and not later than the time that the crank-shaft has reached upper dead-center, whereby ignition of said mixture effects a normal operation of the piston, and a governor for controlling the quantity of mixture to be injected into the cylinder.

23. In an engine, a cylinder, a crank-shaft, a piston attached thereto, igniting means, means located at the firing-portion of the cylinder for exhausting at the end of the work-stroke of the piston and during completion of its return-stroke for scavenging the cylinder, means for injecting an explosive mixture under pressure into the cylinder when the piston is about to commence its work-stroke, that is, just before and not later than the time that the crank-shaft has reached upper dead-center, whereby ignition of said mixture effects a normal operation of the piston, a governor for controlling the quantity of mixture to be injected into the cylinder, and means for controlling the time of effecting the injection of the mixture and the ignition.

24. In an engine, a cylinder, a crank-shaft, a piston attached thereto, igniting means, means located at the firing-portion of the cylinder for exhausting at the end of the work-stroke of the piston and during completion of its return-stroke for scavenging the cylinder, means for injecting an explosive mixture under pressure into the cylinder when the piston is about to commence its work-stroke, that is, just before and not later than the time that the crank-shaft has reached upper dead-center, whereby ignition of said mixture effects a normal operation of the piston, a governor for controlling the quantity of mixture to be injected into the cylinder, means for controlling the time of effecting the injection of the mixture and the ignition, and means for controlling the exhaust.

25. In an engine, a cylinder provided with a firing-chamber of greater dimensional area than the diameter of the piston, a crank-shaft, a piston attached thereto, igniting means, means located at the firing portion of the cylinder for exhausting at the end of the work-stroke of the piston and during completion of its return-stroke for scavenging the cylinder, means for injecting an explosive mixture under pressure into the cylinder just before and not later than the time when said crank-shaft has reached upper dead-center and when the piston is about to commence its work-stroke, whereby ignition of said mixture effects a normal operation of the piston, an air-compressor for producing high compression outside of the cylinder, whereby the mixture when injected into the cylinder is of a highly-compressed character, and means for indicating the degree of compression.

26. In an engine, a cylinder provided with a firing-chamber of greater dimensional area than the diameter of the piston, a crank-shaft, a piston attached thereto, igniting means, means located at the firing portion of the cylinder for exhausting at the end of the work-stroke of the piston and during completion of its return-stroke for scavenging the cylinder, means for injecting an explosive mixture under pressure into the cylinder just before and not later than the time when said crank-shaft has reached upper dead-center and when the piston is about to commence its work-stroke, whereby ignition of said mixture effects a normal operation of the piston, an air-compressor for producing high compression outside of the cylinder, whereby the mixture when injected into the cylinder is of a highly-compressed character, means for indicating the degree of compression, and automatic means for starting the piston.

27. In an engine, a cylinder, a crank-shaft, a piston attached thereto, means for introducing an explosive mixture under pressure into the cylinder just before and not later than the instant that the crank-shaft reaches its upper dead-center position, igniting means, and means located at the firing-portion of the cylinder for exhausting at the end of the work-stroke of the piston and during its return-stroke and until the operation of the introducing means has again been effected, oscillating valves, and double-faced cams for operating the same.

28. In an internal combustion engine, a cylinder, a crank-shaft, a piston attached thereto, means for introducing an aerated medium to either side of the piston for automatically starting the engine, shaft-actuated oscillating valves distinct from and operated independently of said piston, and double-faced cams carried by and rotating with the shaft for operating the same.

29. A two-cycle engine-structure comprising a plurality of spaced-apart chambers including a piston-returning chamber, a piston operating between said chambers, means for switching a motive fluid from one chamber to another, a crank-shaft connected to the piston, a fluid-compressing device located subjacent to the piston and adapted to supply a fluid under pressure to one of said chambers when a crank on the shaft approaches the dead-center.

30. In an engine, a cylinder and a single piston working therein, a power-producing chamber arranged at one side of the piston, a secondary chamber arranged at the opposite side of the piston, means for directing a motive fluid directly from one chamber to the other whereby said fluid operates upon and actuates said piston at every cycle thereof, valve-mechanism timed to operate relatively to the movement of the piston for controlling the passage of the motive fluid from and to the respective chambers, an exhaust-port formed at each end of the cylinder and means for opening the exhaust-port in the power-producing chamber practically when the piston commences its return-stroke, whereby said chamber is freed of gases and pressure therein eliminated as the piston returns to its starting position.

31. In an engine, a cylinder and a single piston working therein, a power-producing chamber arranged at one side of the piston, a secondary chamber arranged at the opposite side of the piston, means for directing a motive fluid directly from one chamber to the other whereby said fluid operates upon and actuates said piston at every cycle thereof, valve-mechanism timed to operate relatively to the movement of the piston for controlling the passage of the motive fluid from and to the respective chambers, an exhaust-port formed at each end of the cylinder, and a valve for each port operating alternately to relieve pressure on either side of the piston at predetermined times, the valve of the exhaust-port in the power-producing chamber operating practically at the commencement of the return of the piston to starting position, whereby gas in said chamber that would otherwise be compressed is freed therefrom.

32. In an internal combustion engine including a cylinder, a firing-chamber, a valve-controlled channel formed in the wall of the cylinder for introducing a gaseous mixture into the firing-chamber, a piston-assisting chamber, a reciprocating piston in the cylinder, means for developing power in said firing-chamber, means for utilizing a portion of the motive fluid remaining in the firing-chamber at the end of the work-stroke of the piston, and means for simultaneously exhausting the remainder of said fluid.

33. In an internal combustion engine including a cylinder, a firing-chamber, a piston-assisting chamber, a reciprocating piston in the cylinder and working between said chambers, means for developing power in said firing-chamber, means for utilizing a portion of the motive-fluid remaining in the firing-chamber at the end of the work-stroke of the piston, means for simultaneously exhausting the remainder of said fluid, and means located at the side of the piston opposite the firing-chamber for relieving pressure on the under side of the piston at each work-stroke thereof.

34. In an internal combustion engine including a cylinder, a firing-chamber, a piston-assisting chamber, a valve-controlled channel formed in the wall of the cylinder and extending between said chambers, a reciprocating piston in the cylinder and working between said chambers, means for developing power in said firing-chamber, means for utilizing a portion of the motive-fluid remaining in the firing-chamber at the end of the work-stroke of the piston, means for simultaneously exhausting the remainder of said fluid, and means located at the side of the piston opposite the firing-chamber for relieving pressure on the under side of the piston at each work-stroke thereof including valve-mechanism operating to close said channel and also to open said piston assisting chamber to the atmosphere.

In testimony whereof I affix my signature in presence of two witnesses.

GEORGE W. DONNING.

Witnesses:
W. L. BILLMYER,
EDMUND H. PARRY.

Copies of this patent may be obtained for five cents each, by addressing the "Commissioner of Patents, Washington, D. C."